United States Patent [19]

Van Niekerk

[11] Patent Number: 4,961,708
[45] Date of Patent: Oct. 9, 1990

[54] EDUCATIONAL PUZZLE

[76] Inventor: William Van Niekerk, 55 Wildwood Park, Winnipeg, Manitoba, Canada, R3T 0C8

[21] Appl. No.: 384,436

[22] Filed: Jul. 25, 1989

[30] Foreign Application Priority Data

Jul. 29, 1988 [GB] United Kingdom ............. 8818103

[51] Int. Cl.⁵ .................... G09B 17/00; G09B 1/00
[52] U.S. Cl. ................................ 434/406; 434/407;
273/296; 273/290; 273/291; 273/153 R
[58] Field of Search ............. 434/171, 159, 160, 151,
434/153, 406, 407, 428, 430; 273/292, 293, 296,
153 R, 156, 157 R, 260, 290, 291; 40/618, 620

[56] References Cited

U.S. PATENT DOCUMENTS

| | | | |
|---|---|---|---|
| 1,303,482 | 5/1919 | Knall | 273/260 |
| 1,714,792 | 5/1929 | Kurihara | 273/291 X |
| 1,978,107 | 10/1934 | Hoffmann | 273/153 R |
| 2,040,855 | 5/1936 | Klemin | 273/260 X |
| 2,075,619 | 12/1935 | Klemin | 273/260 X |
| 3,751,039 | 8/1973 | Dykoski | 273/260 |
| 3,811,206 | 5/1974 | Gaccetta | 434/159 |
| 3,847,397 | 11/1974 | Price | 273/260 X |
| 4,188,734 | 2/1980 | Rich | 434/159 |
| 4,645,209 | 2/1987 | Goulter et al. | 273/291 X |

FOREIGN PATENT DOCUMENTS

| | | | |
|---|---|---|---|
| 492977 | 4/1954 | Italy | 434/171 |
| 214098 | 4/1924 | United Kingdom | 434/171 |

*Primary Examiner*—Richard J. Apley
*Assistant Examiner*—Jennifer L. Doyle
*Attorney, Agent, or Firm*—Murray E. Thrift; Stanley G. Ade; Adrian D. Battison

[57] ABSTRACT

An educational puzzle includes a base panel and a set of puzzle pieces. The base panel has a number of holes through it, while the puzzle pieces have mating pegs extending through them, to both sides. The arrangement is such that the puzzle pieces can be arranged in on the front face of the base panel and with the pegs registering with the holes in the base panel, and arranged in another array on the bottom of the base panel, with the puzzle pieces inverted. The base panel and the puzzle pieces are marked with corresponding or related indicia on their front faces. They may carry similar markings on their back faces, where the puzzle pieces may be arranged with sequential markings designating the sequence in which the puzzle pieces are to be assembled. The puzzle may be used from either side of the base panel as two puzzle features to teach very different yet related concepts: number sequencing or number counting; alphabetical sequencing or word recognition; and other skills.

16 Claims, 6 Drawing Sheets

EDUCATIONAL PUZZLE

FIELD OF THE INVENTION

The present invention relates to educational puzzles, especially such puzzles for teaching young children certain skills, for example word, letter or number recognition.

BACKGROUND

Puzzles can be useful teaching tools for children. With a properly designed puzzle, children learn the intended information while indulging in enjoyable play. Numerous difference concepts can be learned, including number and letter recognition, number and letter sequencing, word recognition and shape recognition.

The objective of the present invention is to provide a simple mechanical puzzle that can be used as a teaching tool, that can teach different subjects, or the same subject at different levels.

SUMMARY

According to the present invention there is provided an educational puzzle comprising:
 a base panel with top and bottom faces;
 a plurality of holes through the base panel;
 a plurality of puzzle pieces with top and bottom faces and having peg extending therethrough, the puzzle pieces being configured to fit together in a first array on the front face of the base panel with the front faces of the puzzle pieces exposed and the pegs engaged in respective ones of the holes, and to fit together in a second array on the back face of the base panel with the back faces of the puzzle pieces exposed and the pegs engaged in respect of ones of the holes.

Thus, by inverting the base panel, the puzzle pieces can be inverted and arranged in order on the back, providing a second puzzle.

Indicia may be marked on the front faces of the base panel and the puzzle pieces, with the indicia on each puzzle piece being related to the indicia which it covers on the base panel.

In one such embodiment of the invention, there are numbers on the base panel accompanied by finger and toe representations of the number. Each puzzle piece has a picture on it displaying a number of articles corresponding to the number at the correct location on the base panel. The indicia on the base panel may be spaced along a track formed by a line painted or otherwise marked on the front face of the base panel.

The back faces of the puzzle pieces may have markings indicating the correct order of assembly, for example sequential numbers or letters. Alternatively, second sets of indicia for example, words and matching pictures can be arranged on the back sides of the base panel and the puzzle pieces.

The invention also provides a one-sided base with puzzle pieces that fit onto one side, and are held in place by the pegs and holes. Related indicia are provided on the base and puzzle pieces.

The base panel may have a flat surface, with no border defining structure. The peg and hole arrangement ensures accurate placement of the pieces, which engage and lock against adjacent pieces.

BRIEF DESCRIPTION OF THE DRAWINGS

In the accompanying drawings, which illustrate exemplary embodiments of the present invention:
FIGS. 6 and 7 illustrate the front faces of a base panel and puzzle pieces of another embodiment.

DETAILED DESCRIPTION

Figure 1:
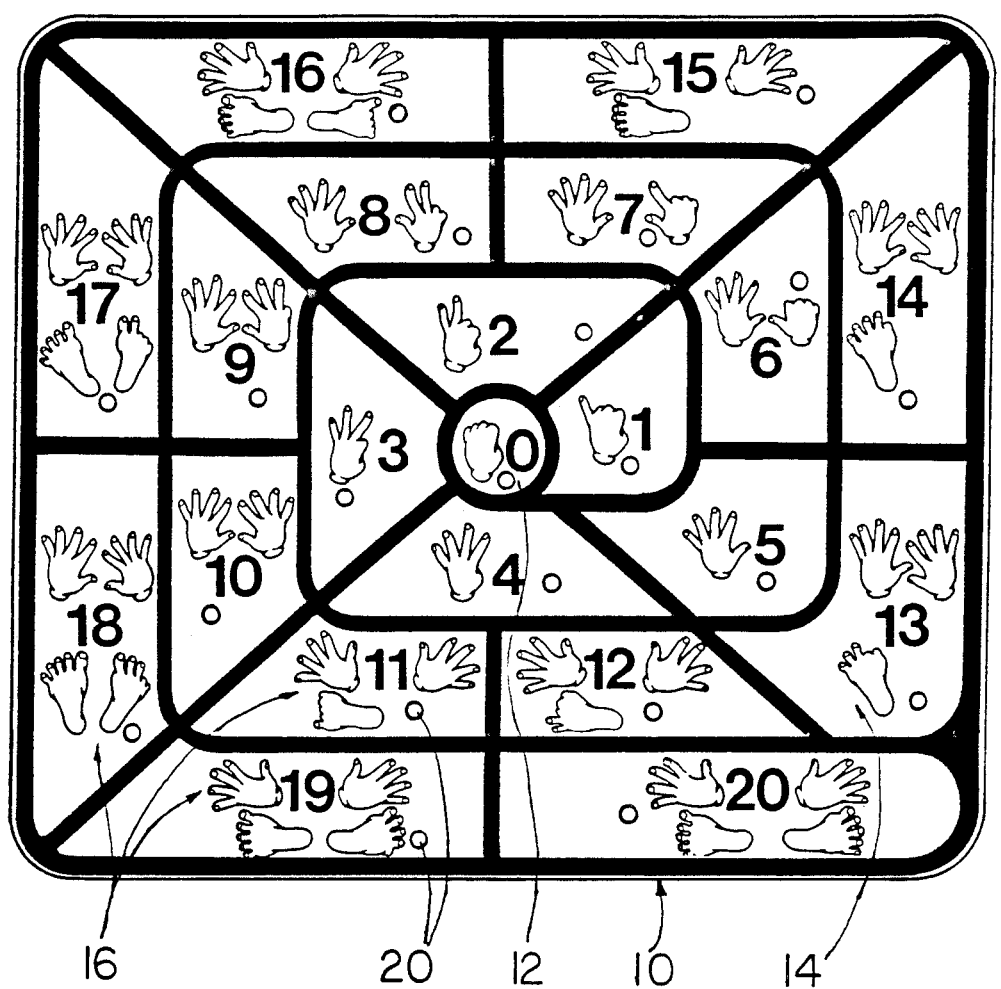
FIG. 1 illustrates the front face of a base panel for a finger counting puzzle.
Figure 2:
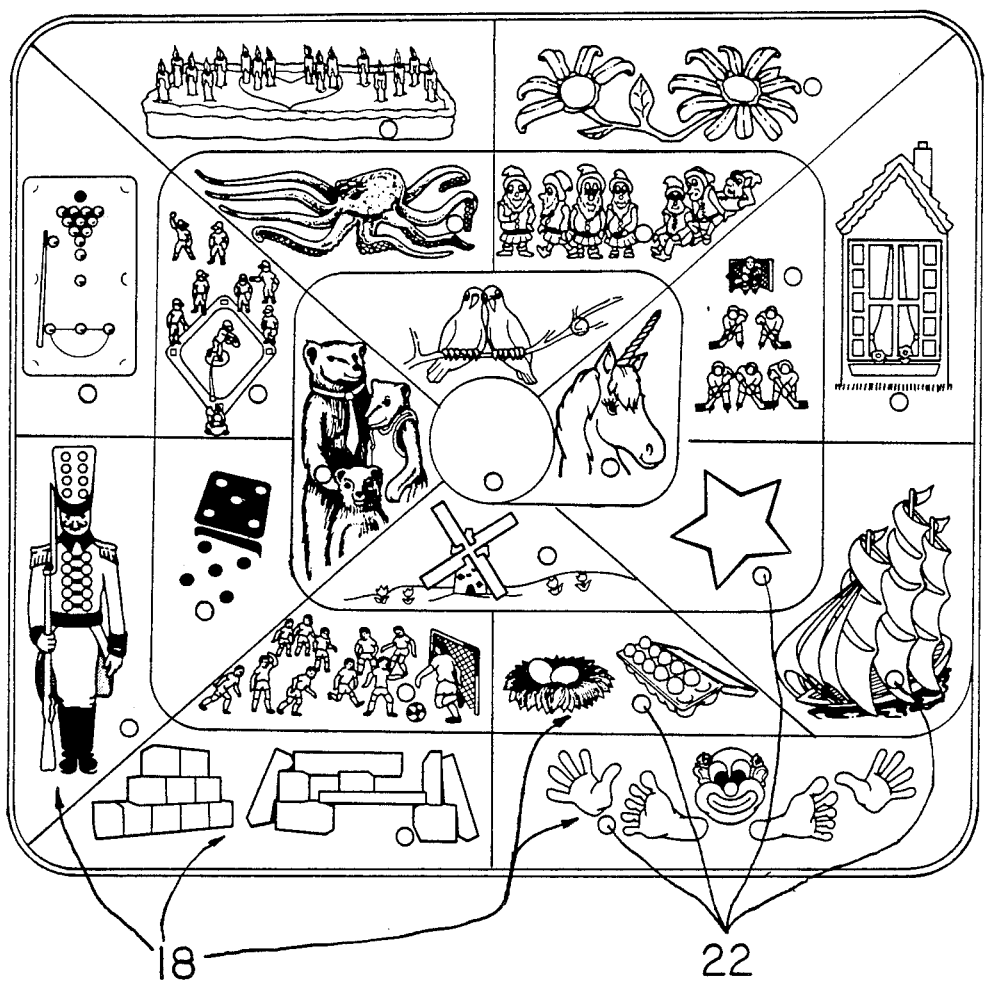
FIG. 2 illustrates the panel of FIG. 1 with the puzzle pieces arranged thereon.

Referring to the drawings, FIGS. 1 to 5 illustrate a counting puzzle. This consists of a base panel 10 painted with a circular centre area 12 and a continuous track 14 that starts adjacent the centre area and winds outwards in rectangular turns with reaches of ever increasing length. The centre area 12 is marked with the number "0" while the track 14 has the numbers 1 to 20 spaced along it. Each number is associated with a hand or hand and foot symbol 16 showing the respective number of fingers and toes. The game pieces in this embodiment are marked with pictures 18 displaying a number of articles corresponding to the number in the track at the correct location for the piece. The centre piece is blank, representing "0".

The base panel is drilled through with a hole 20 in each of the locations for a puzzle piece. The holes are differently located for each of the puzzle piece locations. The puzzle pieces themselves have dowels or pegs 22 that project to the top and the bottom of the puzzle piece. The dowels mate with the holes to locate and retain the puzzle pieces.

When all twenty-one puzzle pieces fit the base panel correctly, the pieces fit side by side with one another, covering the top surface of the base panel.

The puzzle pieces follow a natural number order beginning with "0" at the centre and ending with 20 at the end of the track. Numbers are determined by the count of particular objects on each puzzle piece. This serves as a clue in ordering the puzzle pieces. Pieces can otherwise be fit by following the contour of the track and matching the shapes of the pieces.

The correct fits of the puzzle pieces can be achieved by trial and error. Alternatively, objects on the puzzle pieces can be counted and the piece placed over the puzzle space with the correct number on the base board that represents that count on the piece. The puzzle thus develops skill in counting and in discerning numbers.

Finger-toe counts serve as a further visual aid in developing the concept of number meaning. Numbers 1 to 10 are counted on fingers from left to right with the further counting of numbers 11 to 20 on toes from left to right. Zero has no representation since it represents no quantity.

Figure 3:
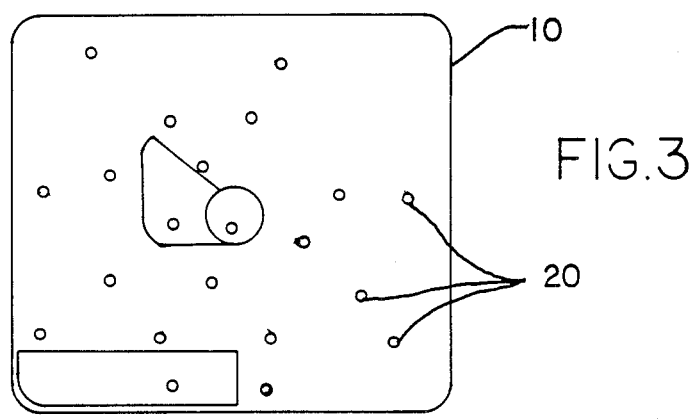
FIGS. 3 and 4 illustrate the back sides of the base panel and puzzle pieces of FIGS. 1 and 2.
Figure 5:
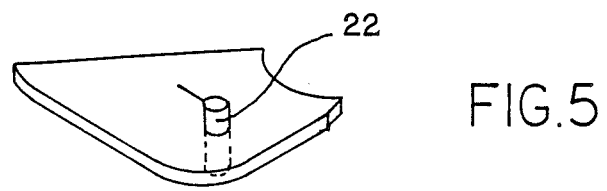
FIG. 5 is an isometric view of a puzzle piece.
Figure 4:
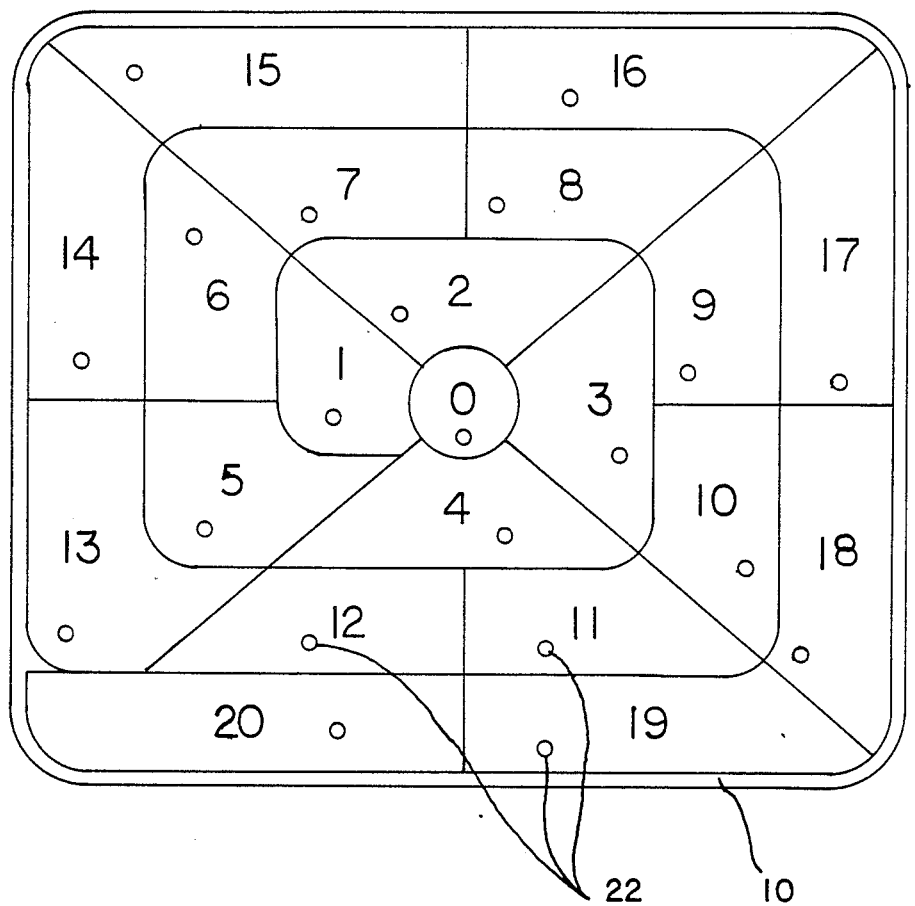

The back face of each puzzle piece is marked with the number which it represents as illustrated in FIG. 4. The base panel and puzzle pieces can then be inverted and used as a second puzzle, in the illustrated example, based on the sequence of numbers printed on the puzzle pieces. In this embodiment, the centre piece and the first and last track pieces are outlined on the back of the board, as illustrated in FIG. 3.

A further embodiment of the invention is illustrated in FIGS. 6 through 9.

Figures 6, 7:
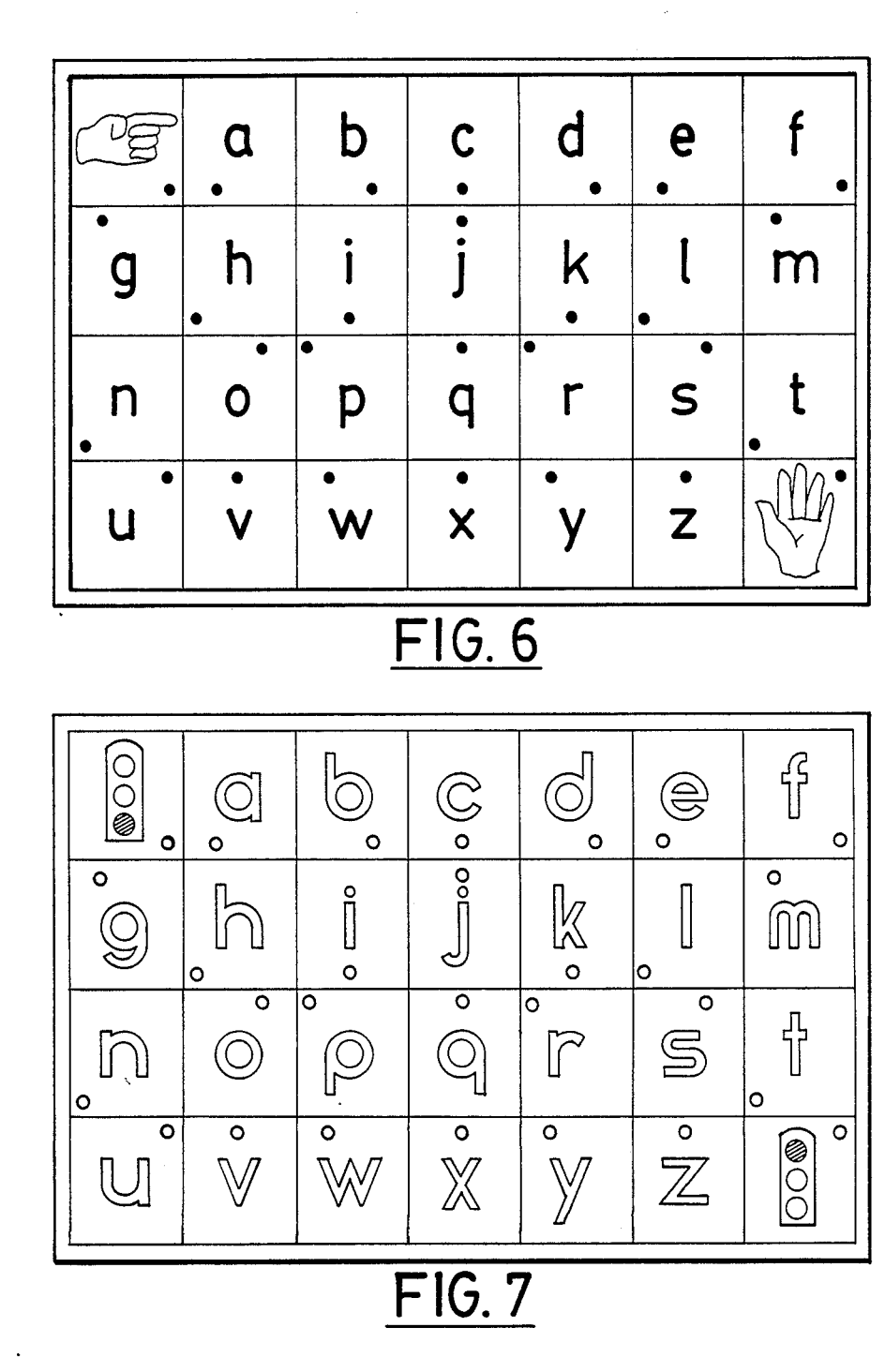

FIG. 6 illustrates the front of a base panel 24 marked with the letters of the alphabet, each letter appearing in a rectangular space. A circular hole 26 is formed through the panel within each rectangular space to receive the peg 28 projecting through a corresponding one of the puzzle pieces illustrated in FIG. 7. The front faces of the puzzle pieces are also marked with the letters of the alphabet.

Figures 8, 9:
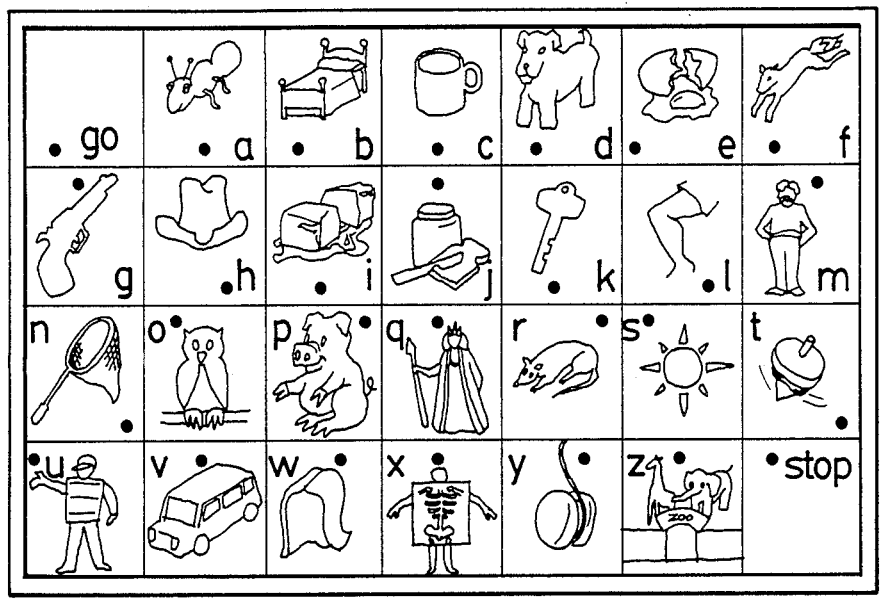
FIGS. 8 and 9 illustrate the back faces of the base panel and puzzle pieces of FIGS. 6 and 7.

As shown in FIG. 8, the back side of the base panel is, like the front side, marked off in rectangular areas with a picture of a simple object in each rectangular area. The first letters of the names of the objects appearing in the rectangular areas are arranged alphabetically.

If the puzzle pieces are reversed as shown in FIG. 9, they display simple words represented by the pictures on the back of the back board. This means that the inverted puzzle pieces can be placed on the back side of the back board in a different correlation game from the game on the front side of the board.

While two specific embodiments of the present invention have been described in the foregoing, it is to be understood that other embodiments are possible within the scope of the present invention. The puzzles can be used to teach number sequencing, counting, numeral or letter recognition, word recognition and so on depending on the particular indicia applied to the puzzle. The two puzzles provided on the front and back faces of the base panel may be related as to subject matter, with the degree of difficulty varying from one to the other. In use, the small pegs may be used not only for registering the pieces on the base panel but also as handles for manipulating the puzzle pieces.

It is to be understood that the foregoing embodiments are exemplary only and that the invention is not limited to those embodiments. The invention is to be considered limited solely by the scope of the appended claims.

I claim:

1. An educational puzzle comprising:
   a base panel with front and back faces;
   a plurality of holes through the base panel;
   a plurality of puzzle pieces with front and back faces and having pegs extending therethrough, the puzzle pieces being configured to fit together in a first array on the front face of the base panel with the front faces of the puzzle pieces exposed and the pegs engaged in respective ones of the holes, and to fit together in a second array on the back face of the base panel with the back faces of the puzzle pieces exposed and the pegs engaged in respective ones of the holes.

2. A puzzle according to claim 1 wherein the second array is the inverse of the first array.

3. A puzzle according to claim 1 including a first set of base panel indicia marked on the front face of the base panel and a first set of puzzle indicia marked on the front faces of the puzzle pieces and related to respective ones of the indicia on the front face of the base panel such that with the puzzle pieces arranged in the first array, the indicia on each puzzle piece and on the base panel beneath the piece are related indicia.

4. A puzzle according to claim 3 including a second set of puzzle indicia marked on the back faces of the puzzle pieces and arranged in a predetermined sequence when the puzzle pieces are arranged in the second array.

5. A puzzle according to claim 4 including a second set of base panel indicia on the back face of the base panel, indicating the location of at least one puzzle piece in the second array.

6. A puzzle according to claim 3 including a track on the front face of the base panel, the puzzle pieces being arranged side by side along the track in a predetermined sequence in the first array thereof.

7. A puzzle according to claim 6 wherein the first set of base panel indicia comprise numbers and finger and toe representations of the numbers.

8. A puzzle according to claim 7 wherein the first puzzle piece indicia comprise a picture on each puzzle piece, each picture displaying a number of articles corresponding to the number on the track beneath the puzzle piece.

9. A puzzle according to claim 3 including a second set of base panel indicia marked on the back face of the base panel and a second set of puzzle piece indicia marked on the back face of the puzzle pieces and related to respective ones of the indicia of the second set of base panel indicia such that with the puzzle pieces arranged in the second array, the indicia on each piece and on the base panel beneath the piece are related indicia.

10. A puzzle according to claim 9 wherein the first set of base panel indicia comprise the letters of the alphabet.

11. A puzzle according to claim 10 wherein the first set of puzzle piece indicia comprise the letters of the alphabet.

12. A puzzle according to claim 11 wherein the second set of puzzle piece indicia comprise words.

13. A puzzle according to claim 12 wherein within the puzzle pieces arranged in the second array, the words are arranged with their initial letters in alphabetical order.

14. A puzzle according to claim 13 wherein the second set of base panel indicia comprises pictures representing the words.

15. A puzzle according to claim 1 wherein the base panel is rectangular.

16. An educational puzzle comprising:
   a base panel with a front face;
   a plurality of holes in the front face of the base panel;
   a plurality of puzzle pieces with front and back faces and having pegs extending therethrough, the puzzle pieces being configured to fit together in an array on the front face of the base panel with the pegs engaged in respective ones of the holes;
   a set of base panel indicia marked on the front face of the base panel and a set of puzzle piece indicia marked on the puzzle pieces and related to respective ones of the indicia on the front face of the base panel such that with the puzzle pieces arranged in said array, the indicia on each puzzle piece and on the base panel beneath the piece are related indicia.

* * * * *